UNITED STATES PATENT OFFICE.

FRANDS T. BAKKER, OF CHICAGO, ILLINOIS.

IMPROVED FLUID FOR EXCITING GALVANIC CHAINS.

Specification forming part of Letters Patent No. 79,432, dated June 30, 1868.

*To all whom it may concern:*

Be it known that I, FRANDS T. BAKKER, of Denmark, resident of Chicago, in the county of Cook and State of Illinois, have invented new and useful Fluid for Portable Galvanic Chains; and I do hereby declare that the following is a full and exact description thereof.

The nature of my invention consists in producing a liquid to be applied to galvanic chains in treating different diseases by galvanism, and of such a nature as to generate a strong and steady galvanic current.

To enable others skilled in the art to make and use my invention, I will proceed to describe its preparation.

From extensive experience in treating numerous muscle and nerve diseases by galvanism I discovered that the best liquid to saturate the woolen flannel of the links of my portable galvanic chain, (for which I herewith forward an application for Letters Patent,) and generate a strong, steady, and continuous galvanic current that would produce a powerful reaction on the human body, should consist of the following ingredients: On two (2) parts of distilled water put one (1) part of sulphuric acid one (1) part of vinegar, and one-fourth (¼) part of salt.

What I claim as my invention, and desire to secure by Letters Patent, is—

The fluid consisting of herein-stated ingredients, mixed in proportions as described, to be used in combination with galvanic chains, in treating diseases by galvanism.

FRANDS T. BAKKER.

Witnesses:
J. B. TURCHIN,
B. M. HANSEN.